US009251707B2

(12) United States Patent
Kugel et al.

(10) Patent No.: US 9,251,707 B2
(45) Date of Patent: Feb. 2, 2016

(54) HIGHLY ACCURATE SYSTEM FOR WRONG-WAY DRIVING DETECTION AND DETERRENCE

(71) Applicants: Jason Kugel, Brown Deer, WI (US); Brian Scharles, Brown Deer, WI (US)

(72) Inventors: Jason Kugel, Brown Deer, WI (US); Brian Scharles, Brown Deer, WI (US)

( * ) Notice: Subject to any disclaimer, the term of this patent is extended or adjusted under 35 U.S.C. 154(b) by 0 days.

(21) Appl. No.: 14/329,640

(22) Filed: Jul. 11, 2014

(65) Prior Publication Data

US 2015/0356871 A1 Dec. 10, 2015

Related U.S. Application Data

(63) Continuation-in-part of application No. 14/298,433, filed on Jun. 6, 2014, now abandoned.

(51) Int. Cl.
| | |
|---|---|
| *G01C 21/36* | (2006.01) |
| *G08G 1/16* | (2006.01) |
| *G01G 1/16* | (2006.01) |
| *G01S 3/82* | (2006.01) |

(52) U.S. Cl.
CPC ............ *G08G 1/164* (2013.01); *G01C 21/3697* (2013.01); *G01G 1/16* (2013.01); *G01S 3/82* (2013.01)

(58) Field of Classification Search
CPC .............................. G08G 1/164; G08G 1/167
See application file for complete search history.

(56) References Cited

U.S. PATENT DOCUMENTS

| | | | | |
|---|---|---|---|---|
| 5,892,226 | A * | 4/1999 | Robinson et al. | 250/338.3 |
| 6,223,125 | B1 * | 4/2001 | Hall | 701/301 |
| 2007/0222639 | A1 * | 9/2007 | Giles et al. | 340/907 |
| 2015/0141043 | A1 * | 5/2015 | Abramson et al. | 455/456.1 |
| 2015/0168174 | A1 * | 6/2015 | Abramson et al. | 701/408 |

* cited by examiner

*Primary Examiner* — Van Trieu
(74) *Attorney, Agent, or Firm* — Absolute Technology Law Group, LLC

(57) ABSTRACT

The present invention is a highly accurate detector system for detecting and responding to wrong-way driving incidents. An optimum configuration and combination of sensors gather data corresponding to predetermined vehicle movement test parameters; a set number of parameter deviations from predetermined thresholds will initiate various sensor signals. The sensor signals may be transmitted to the computer processor, which may in turn produce a range of system outputs. In various embodiments, system outputs may include but are not limited to outputs activating other system components, outputs initiating data storage and analysis, and outputs interfacing and communicating with other systems.

19 Claims, 3 Drawing Sheets

HIGHLY ACCURATE SYSTEM FOR WRONG-WAY DRIVING DETECTION AND DETERRENCE

CROSS-REFERENCE TO RELATED APPLICATIONS

This application claims priority to U.S. Provisional Applications Nos. 61/887,255, 61/887,260 and 61/887,265 filed on Oct. 4, 2013.

FIELD OF INVENTION

This invention relates to the field of image analysis, and more specifically to a system to detect wrong-way driving incidents in real time with a high degree of accuracy to enable effective deterrence and intervention.

GLOSSARY

As used herein, the term "computer processer" means any computer hardware component configured to receive input and provide a transformative operation to obtain the appropriate output. A computer processor may be a single computer, a local area network or a geographically distributed network of computer processing components.

As used herein, the term "predetermined vehicle movement test parameter" means any measurable vehicle movement data that can be quantified, correlated, analyzed or captured for use in detecting, analyzing or archiving an event (e.g., an instance of a wrong-way driving event).

As used herein, the term "quasi-unique" means a location, data or parameter set in which some or all elements may be distinct from another location, data or parameter set, or in which the location, data or parameter set is determined independently from other location, data or parameter sets.

As used herein, the term "real time" means the approximate time frame during which a process or event occurs.

As used herein, the term "sensor signal" or "visual sensor signal" means an output created by a sensor or visual sensor device. Examples of a sensor signal or visual sensor signal include but are not limited to a signal which activates or changes the state of a system component (component activation signal), a signal which interfaces with a communication system (communication signal), or a signal which initiates a process for saving storing or archiving data (archival signal).

As used herein, the term "system output" means an output created by a computer processor. Examples of a system output include but are not limited to a signal which activates or changes the state of a system component (component activation signal), a signal which interfaces with a communication system (communication signal), or a signal which initiates a process for saving storing or archiving data (archival signal).

As used herein, the term "target rate of error" means a maximum level of difference between an observed value of a quantity and its true value. Target rate of error is inversely related to the number of sensors and directly related to individual sensor error rates.

As used herein, the term "target rate of reliability" means a minimum level of consistency between an observed value of a quantity and its true value. Target rate of reliability is inversely related to the overlap between predetermined vehicle movement test parameters and directly related to the individual sensor reliability rates.

As used herein, the term "vehicle motion sensor" means a sensor configured to measure any physical quantify related to motion and to convert the measurement to a signal.

As used herein, the term "visual sensor device" means a sensor with the ability to obtain images or image data. Visual sensor devices may or may not be configured to store, analyze, filter and/or annotate visual data when activated.

As used herein, the term "wrong-way directional movement" means movement that is contrary to the sanctioned movement of traffic on a section of roadway or point of ingress or egress.

BACKGROUND

Figure 1:
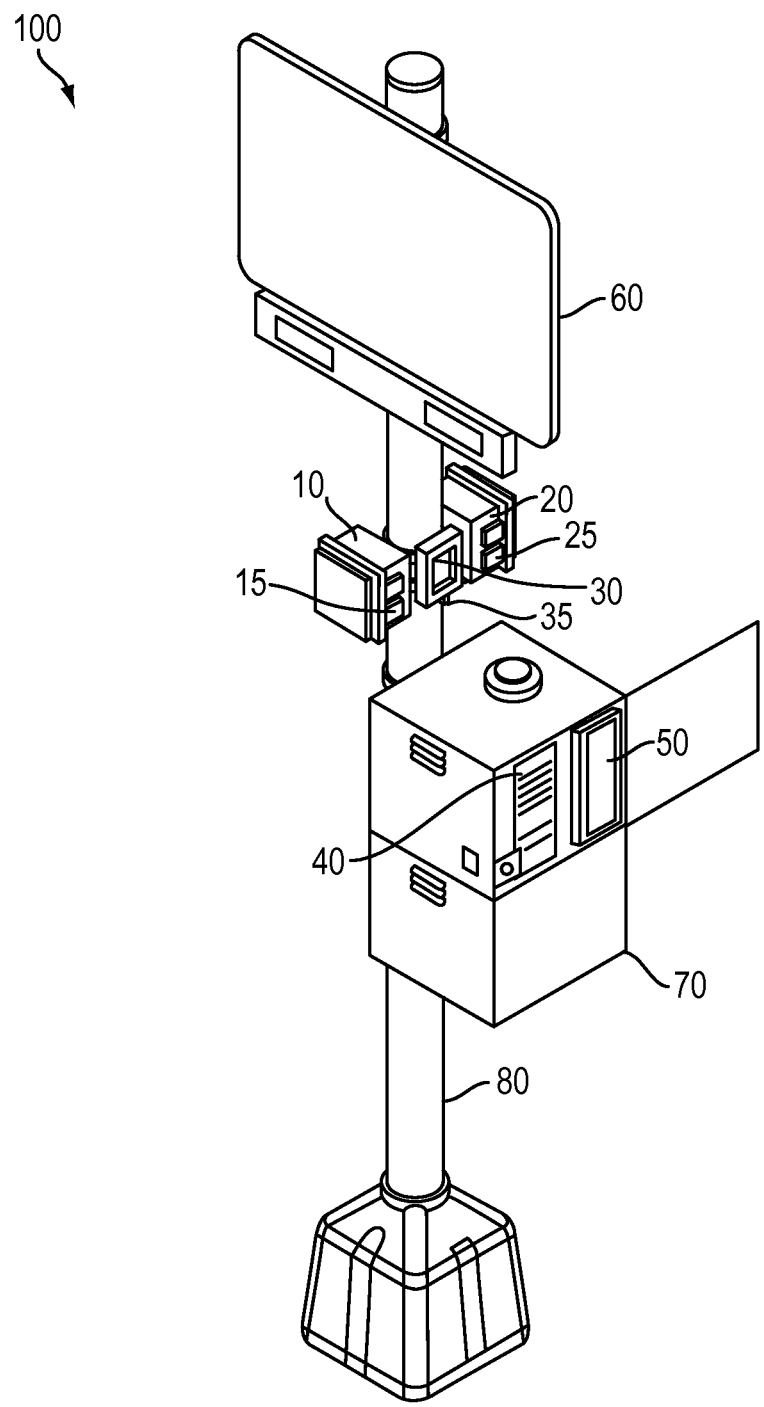
FIG. 1 illustrates one embodiment of a detector system, which includes an exemplary configuration of sensors, recording devices and image and data capture tools.

Wrong-way driving accidents are among the most dangerous and statistically significant. These accidents occur when a driver enters a roadway going in the wrong direction. Once an aberrant driver has entered the roadway, these accidents are likely to involve two or more cars and result in multiple fatalities. It is critical to provide proximate or real time intervention to prevent such accidents. Generally, emergency personnel are limited to responding to witness reports and calls. By the time authorities reach the scene, an accident has occurred or the driver has left the location where the wrong-way driving incident was observed.

Automated systems are used to detect an incident of wrong-way driving and provide intervention to a driver before the driver enters the roadway. Systems that provide this capability are referred to as Intelligent Traffic Systems (ITS). ITS technologies known in the art rely on sensing components to detect wrong-way driving incidents and to provide real time warning signals to drivers.

Currently, ITS sensing components known in the art have unacceptably high error rates for detecting instances of wrong-way driving. With thousands of cars passing a system, even a very small ITS error rate is unacceptable because it can result gross inaccuracies and misdirection of time-critical resources. For example, a system that monitors 10,000 cars per week with a 5% error rate could falsely indicate 500 incidents of wrong way driving per week and miss a similar number of actual incidents. There is an unmet need for ITS technology with near 100% accuracy.

A typical ITS known in the art consists of a detection subsystem using Doppler radar or an inductive loop detector to sense instances of wrong-way driving and initiate redirection cues such as lights, barriers and alarms. ITS sensors known in the art typically have a detection error rate of plus or minus 5 to 20%.

Many attempts have been made in the art to solve the problem of detecting and deterring wrong-way drivers. In 2012, the National Transportation Safety Board (NTSB) conducted a multi-year study of data related to wrong-way driving accidents.[1] The study was conducted, in part, to determine whether the NTSB should recommend that states invest in existing ITS technologies. The NTSB declined to recommend that states implement ITS countermeasures, citing a lack of data as to the effectiveness of such systems.[2]

[1] U.S. National Transportation Safety Board. (2012). *Highway Special Investigation Report: Wrong Way Driving*. Washington, D.C.: U.S. Government Printing Office (PB 2012-917003)

[2] The NTSB is a federal agency with the Congressional mandate to make safety recommendations to states. Since 1967, NTSB has issued approximately 13,000 safety recommendations, the majority of which have been implemented by states. The NTSB has cited the lack of "readily accessible quantity and quality of wrong way collision data" as a reason for declining to issue recommendations for ITS systems.

Many states studies have independently recommended or purchased existing ITS technologies, despite their proven statistical unreliability for detecting incidents of wrong-way driving.

The National Center for Statistics and Analysis (NCSA), an office of the National Highway Traffic Safety Administration (NHTSA), is responsible for providing incident, accident avoidance and countermeasure effectiveness data to support NTSB recommendations. The NCSA does not currently have a system in place for gathering data on the effectiveness of ITS implementations. The only available data is generally anecdotal witness and accident reports. There is no way to measure the number of drivers that are redirected before an accident occurs. There is a need for statistically reliable ITS systems suitable for conducting the necessary studies to support an NTSD recommendation.

There is an unmet need for an ITS that can accurately detect wrong-way driving instances and to provide the capability for various forms real time intervention.

There is a further unmet need for a data gathering system that can provide reliable observational data for use in studying the effectiveness of wrong-way driving countermeasures.

SUMMARY OF THE INVENTION

The present invention is a detector system for detecting and deterring wrong-way driving. In various embodiments, the system is rapidly deployable, cost-effective and capable of producing and analyzing data critical to deterring and detecting wrong-way driving incidents. The system utilizes a novel configuration of interoperable sensors and computer processors.

The detector system includes multiple vehicle motion sensors, a visual sensor device, a computer processor and a mounting component. The sensors gather data corresponding to predetermined vehicle movement test parameters including but not limited to direction, speed, duration, time, sequence, conditions, concurrent incidents, etc. The sensors analyze sensed predetermined vehicle movement test parameters; a set number of parameter deviations from pre-determined thresholds will initiate various sensor signals. The sensor signals may be transmitted to the computer processor, which may produce a range of system output. In various embodiments, system outputs may include but are not limited to outputs activating other system components, outputs initiating data storage and analysis, and outputs interfacing and communicating with other systems. For example, when a pre-determined number of sensor signals is reached, the computer processor may transmit a system output to interface with an internal or external system component or communicate with another system, such as a law enforcement agency.

DETAILED DESCRIPTION OF INVENTION

For the purpose of promoting an understanding of the present invention, references are made in the text to exemplary embodiments of a Highly Accurate System for Wrong-Way Driving Detection and Deterrence, only some of which are described herein. It should be understood that no limitations on the scope of the invention are intended by describing these exemplary embodiments. One of ordinary skill in the art will readily appreciate that alternate but functionally equivalent components may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale. Instead, emphasis has been placed upon illustrating the principles of the invention. Like reference numerals in the various drawings refer to identical or nearly identical structural elements.

Moreover, the terms "about," "substantially" or "approximately" as used herein may be applied to modify any quantitative representation that could permissibly vary without resulting in a change in the basic function to which it is related.

FIG. 1 illustrates one embodiment of a detector system 100, which includes an exemplary configuration of sensors, recording devices and image and data capture tools. The detector system 100 includes a first vehicle motion sensor 10, an additional vehicle motion sensor 20, a visual sensor device 30, a computer processor 40, an optional graphic user interface 50, an optional traffic control device 60, at least one optional storage component 70 and at least one mounting component 80.

In the exemplary embodiment, first vehicle motion sensor 10 is a Doppler radar sensor, programmed to capture and analyze at least one predetermined vehicle movement test parameter of a detected vehicle. In various other embodiments, first vehicle motion sensor 10 is a microwave- or infrared-emitting and receiving sensor, a passive infrared sensor, an induction loop, at least one trip sensor, at least one piezoelectric sensor, at least one magnetometer or any other sensors known in the art capable of detecting and transmitting the speed, directionality and detection duration of any vehicle.

First vehicle motion sensor 10 is configured with software to transmit or store a first sensor signal if a first threshold is met or exceeded by the captured predetermined vehicle movement test parameter, depending upon additional system configurations related to process and sequencing of sensed data. In various embodiments, first vehicle motion sensor may be programmed to transmit or store a first sensor signal if multiple thresholds are exceeded to achieve optimum detection accuracy. First vehicle motion sensor 10 includes a first transmitter 15, which transmits the first sensor signal to other components of the system, such as computer processor 40 and traffic control device 60. Other components within detector system 100 operatively connect to first vehicle motion sensor 10 through a physical connection or a wireless connection.

Various thresholds may include speed thresholds, direction thresholds and detection duration thresholds. A speed threshold may include, but is not limited to a minimum detection speed, a maximum detection speed, legal speed limits, safe speeds for current road conditions and safe speeds for current weather conditions. A direction threshold may include, but is not limited to the direction of correct traffic flow, the direction of temporary traffic flow, the direction against correct traffic flow or the direction against temporary traffic flow. A detection duration threshold may include, but is not limited to a minimum length of time a vehicle is detected or a maximum length of time a vehicle is detected.

Additional vehicle motion sensor 20 is substantially identical in form and function to first vehicle motion sensor 10. Additional vehicle motion sensor 20 is configured with software to store an additional sensor signal or to transmit the additional sensor signal through second transmitter 25.

Additional vehicle motion sensor 20 (and still other additional vehicle motion sensors and/or visual sensing devices in various embodiments) may be independently configured to detect different pre-selected predetermined vehicle movement test parameters and/or compare them to different thresholds. The multiple independent sensors and quasi-unique predetermined vehicle movement test parameters ensure a higher degree of accuracy because system errors are less likely to propagate.

The target rate of reliability R for a given number of sensors n is determined based on an incremental accuracy of each of said given sensors and adjusted for overlap between predetermined vehicle movement test parameters using the following equation:

$$R = \frac{r_1 + \ldots + r_n - (nr_o)}{n - (nr_o)}$$

where $r_i$ is the incremental accuracy for a given sensor where i=1 ... n and $r_o$, is the overlap between predetermined vehicle movement test parameters of the given sensors. For example, a system with three sensors having incremental accuracies of $r_1$=0.95, $r_2$=0.95 and $r_3$=0.98 and no overlap between test parameters would have a target rate of reliability of $$R = \frac{0.95 + 0.97 + 0.98 - (3*0)}{3 - (3*0)} = 0.9\overline{6}, \text{ or } 96.\overline{6}\%$$

Any vehicle motion sensor or visual sensor device may be individually configured to independently obtain various types of sensed data. In some embodiments, vehicle motion sensors may independently generate sensor signals. In various embodiments, vehicle motion sensors are paired or interoperably configured with other sensors. In various embodiments, vehicle motion sensors or visual sensor devices may be enclosed within protective housings or structures. Such protective housings or structures may have additional capability to prevent interference or noise.

As shown in the exemplary embodiment of FIG. 1, detector system 100 includes at least one visual sensor device 30, which contains visual sensing capabilities and algorithms distinct from other on-visual sensors. In various embodiments, visual sensor device 30 may be a digital still photography or video camera as is commonly known in the art. In various embodiments, visual sensor device 30 may be of varying accuracy and complexity and be capable of capturing any type of visually or motion sensed data know in the art. Other embodiments of visual sensor device 30 detect attributes of motion. Still other embodiments of visual sensor device 30 may include a flash unit or utilize a number of pixels allowing for high levels of image resolution. In various embodiments, visual sensor device 30 may include processing and memory capability such as filtering, screening, image adjustment, image capture adjustment, data storage and time stamping. Alternate embodiments of detector system 100 may include additional visual sensor devices to obtain increased amounts of visual data.

In the exemplary embodiment shown, visual sensor device 30 is configured to continuously record visual data from a predetermined field of view, such as a portion of a roadway, and analyze any vehicles detected to obtain vehicle motion data and at least one predetermined visual vehicle movement test parameter. Visual sensor device 30 is configured with software to store or transmit a visual data output if a visual threshold is met or exceeded by at least one predetermined visual vehicle movement test parameter.

The visual data output may also include at least one frame of visual data including the detected vehicle. In the exemplary embodiment, the visual data output includes multiple frames of visual data. In another embodiment, the visual data output includes at least six frames of visual data. Visual sensor device 30 transmits the visual data output through a third transmitter 35 to other components of the system, such as computer processor 40, to which it is operatively connected. Other components within detector system 100 operatively connect to visual sensor device 30 through a physical connection or a wireless connection.

Various alternate embodiments of detector system 100 may include additional vehicle motion sensors and/or additional visual sensor devices. Increased sensing and recording capabilities reduce the already low rate of detection errors of detector system 100. A target rate of error $E_s$ for a given number of sensors n may be expressed by the following formula:

$$E_s = \frac{E_1 + \ldots + E_n}{n^2}$$

where $E_i$ is an error rate for a given sensor where i=1 ... n. The number of sensors and error rates of said sensors are selected for the exemplary embodiment of detector system 100 such that $E_s$ approaches zero. For example, a system with three sensors having error rates of $E_1$=0.04, $E_2$=0.02 and $E_3$=0.02 would have a target rate of error of $$E_s = \frac{0.04 + 0.02 + 0.02}{3^2} = 0.008\overline{8}, \text{ or } 0.8\overline{8}\%$$

In the embodiment shown, computer processor 40 is a computer processing unit (CPU) operatively connected to first vehicle motion sensor 10, additional vehicle motion sensor 20 and visual sensor device 30, and configured to receive the first sensor signal, at least one additional sensor signal and visual data output. In various embodiments, computer processor is operatively connected to optional system components as well. Various embodiments of computer processor 40 may include, but are not limited to a computer network, a computer, a central processing unit, a microprocessor or an application-specific instruction-set processor.

In the exemplary embodiment shown, after receiving the first sensor signal, at least one additional sensor signal and visual data output, computer processor 40 may transmit a system output to a pre-programmed destination.

A component activation output signal may be transmitted to an additional component of detector system 100, such as traffic control device 60. A communication interface output signal may be transmitted to an external communications system, while an archival output signal may be transmitted to another component of detector system 100 capable of storing the archival output signal. The communication interface and archival output signals may include data such as the first sensor signal, at least one additional sensor signal and visual data output, date data, time data, location data, and visual data received from visual sensor device 30. In the exemplary embodiment, the external communications system may be, but is not limited to a cloud-based server or database, an external computer processor or to one or more users, such as, but not limited to a member or members of law enforcement or other governmental entities.

Computer processor 40 can be programmed with offset compensation to adjust for different component positions or orientations, or different mounting configurations, adjusted thresholds for different days or times, or comparison software to compare data from additional detector systems to eliminate anomalies. Computer processor 40 can also be programmed to automatically save or upload data for recall and subsequent reporting or to automatically sort or analyze data to provide comprehensive reports, identify positive and negative trends for actions and allow rapid review of the histories of equipment and events.

Computer processor 40 also monitors and controls the detector system 100 as a whole. Computer processor 40 can be programmed to show device status and send automated e-mail or text alerts based on battery levels dropping below pre-set levels. Users can select the recipients and form of alerts, as well as levels of alerts. Users can also program daily events into the system, with at least eight different types of days and at least sixteen different events per day.

Optionally, computer processor 40 may also include a graphic user interface 50 for user interaction with the detector system 100. User interface 50 may include an interactive map allowing a user to view equipment locations, review device status reports and modify settings. The interactive map may include a zoomable overview of all devices, pop-up status indicators and lists of selectable devices. User interface 50 may also include a dashboard display showing individual device data such as, but not limited to each device's cell status, battery voltage, temperature, solar voltage and current. Historic data can be organized by day, week, month and year.

Optionally, detector system 100 includes traffic control device 60. In the embodiment illustrated in FIG. 1, traffic control device 60 is a road sign as is commonly known in the art, equipped with a plurality of lights that flash in a predetermined cueing pattern. The plurality of lights are capable of flashing on and off in regular or irregular intervals or patterns to provide a signal to the operator of a vehicle. In various embodiments, traffic control device 60 receiving a component activation output initiates such a flashing interval or pattern to provide a warning to the operator of a detected vehicle. In various embodiments, one or more additional traffic control devices 60 may be used. The additional traffic control devices 60 can activate with the same or different activation outputs. In various embodiments, traffic control device 60 may be a light activated sign, a pattern of lights, a selectively illuminated road sign, an electronic message board, an audible warning device or any combination thereof.

Optionally, computer processor 40 may also include storage component 70, a storage database operatively connected to first vehicle motion sensor 10, additional vehicle motion sensor 20, visual sensor device 30 and/or computer processor 40 through a physical connection or a wireless connection. Storage component 70 is configured with software to receive and store data including visual data, visual data output, archival and first and additional sensor signals, as well as time and location data. Storage component 70 is further configured with software to transmit the stored data to computer processor 40. Various embodiments of storage component 70 may include, but are not limited to a flash memory device, a hard disk drive, a CD, a DVD or a RAM module.

As shown in the exemplary embodiment of FIG. 1, the various components of detector system 100 are attached to at least one mounting component 80. Mounting component 80 can be, but is not limited to, a pole, a trailer, a building, a roof, a wall or an infrastructure type of element. Mounting component 80 can be vertical, horizontal or angled. Mounting component 80 can be a single mounting component or multiple mounting components; multiple mounting components may be of a single type or different types. In embodiments where mounting component 80 includes multiple mounting components 80, these multiple mounting components 80 may have different geographical locations, with other components of detector system 100 distributed between the multiple mounting components 80.

In certain embodiments of detector system 100, other components of detector system 100 are permanently fixed to at least one mounting component 80 in a single permanent site. In additional embodiments, elements of detector system 100 are removable from mounting component 80, and can be set up in one site, then taken down and moved to another site. In other contemplated embodiments of detector system 100, elements of detector system 100 are permanently attached to a portable mounting component 80, which moves from site to site.

In the exemplary embodiment shown in FIG. 1, a single, vertical pole-type mounting component 80 mounts the remaining components of detector system 100. In various embodiments, first and additional vehicle motion sensors 10 and 20 may be programmed with data relative to their position, which may be used by computer processor 40 to perform relevant adjustments to predetermined vehicle movement test parameters to achieve optimal verification and error reduction. In other embodiments, computer processor 40 is programmed with the positional data of first and additional vehicle motion sensors 10 and 20 to perform the adjustments.

In the exemplary embodiment of FIG. 1, first vehicle motion sensor 10 and additional vehicle motion sensor 20 are located at opposite sides of mounting component 70, with visual sensor device 30 between first vehicle motion sensor 10 and additional vehicle motion sensor 20.

Figure 2:
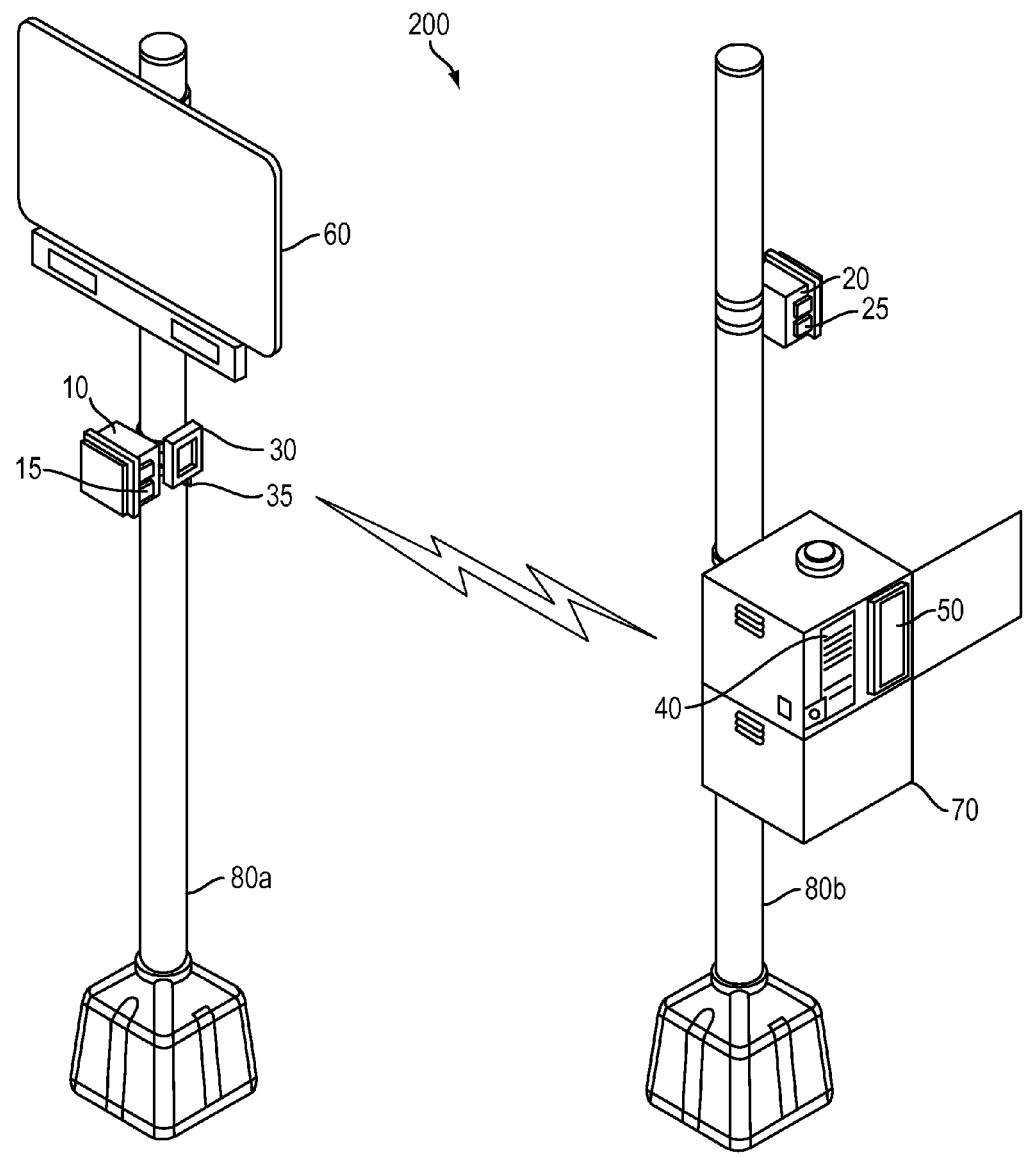
FIG. 2 illustrates one embodiment of a detector system, which includes an alternative configuration of sensors, recording devices and image and data capture tools distributed between multiple mounting components.

FIG. 2 illustrates one embodiment of a detector system 200, which includes an alternative configuration of sensors, recording devices and image and data capture tools distributed between multiple mounting components. In the embodiment shown in FIG. 2, detector system 200 includes multiple mounting components 80a and 80b. System components distributed between mounting components 80a and 80b form a geographically interoperable capability for communicating with computer processor 40. As previously mentioned, in this embodiment computer processor 40 includes programmed offset compensation to adjust for the different component positions.

Figure 3:
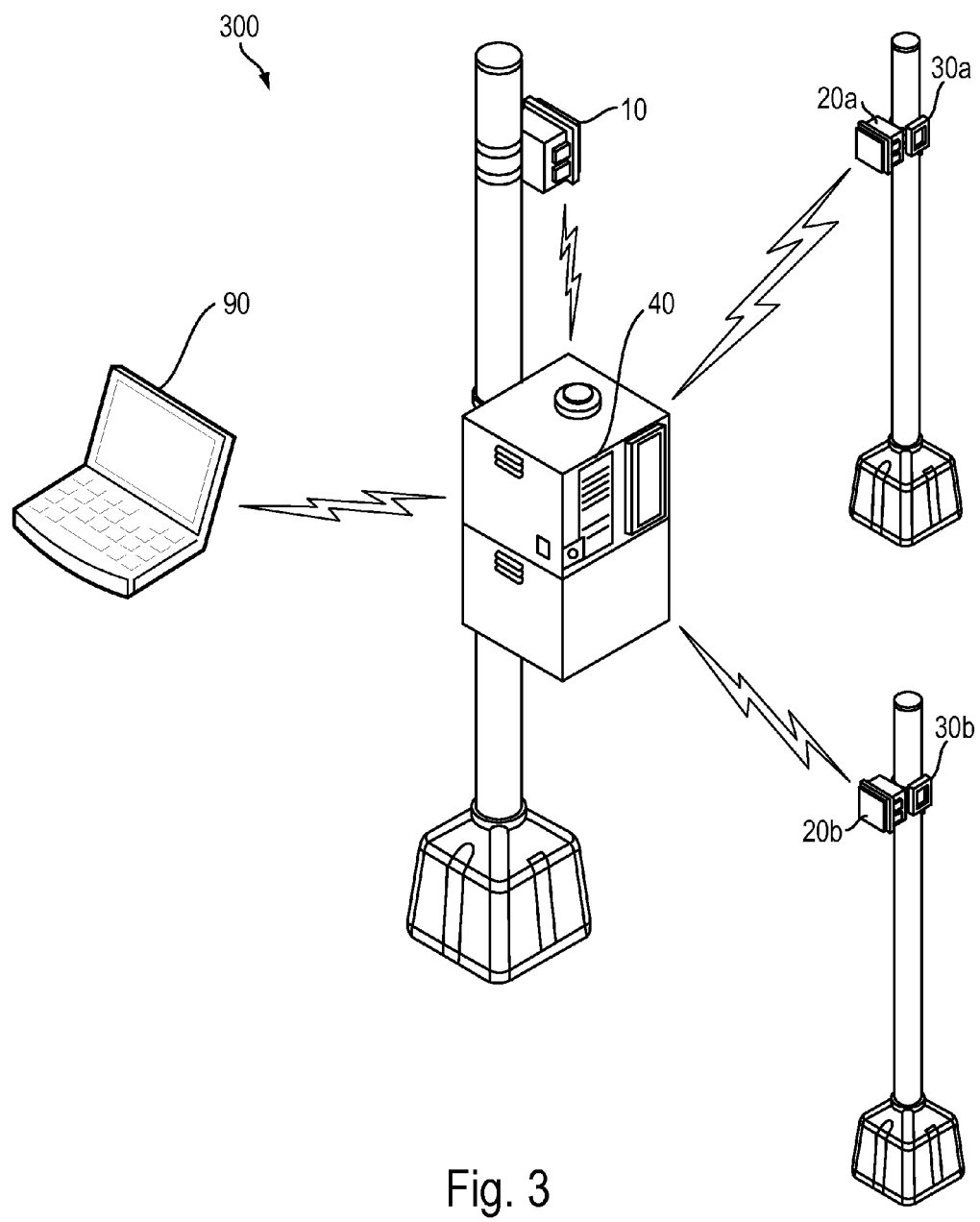
FIG. 3 illustrates one embodiment of an intraoperative system with multiple sensors in communication with a single computer processor.

FIG. 3 illustrates one embodiment of an intraoperative detector system 300 with multiple sensors in communication with a single computer processor. In the alternate embodiment shown in FIG. 3, detector system 300 includes first vehicle motion sensor 10, two additional vehicle motion sensors 20a and 20b, multiple visual sensor devices 30a and 30b, computer processor 40 and an external communications system 90. As shown in FIG. 3, the distributed system sensing components (10, 20a, 20b, 30a, 30b) interoperably communicate with computer processor 40. External communications system 90 also interoperably communicates with computer processor 40.

While the above exemplary embodiments have been described as a system for detecting and deterring wrong-way driving, other embodiments of this detector system may have other applications. Some applications for this detector system include detecting accidents, providing active warnings for vehicle drivers during certain times or under certain conditions, monitoring overall traffic flow, monitoring traffic flow and direction in uncontrolled areas, monitoring traffic in secure and restricted areas and providing warnings for vehicle drivers in secure and restricted areas. These applications may be created by selectively altering the thresholds, adding additional system components, or altering the location relationships between system components.

What is claimed is:

1. A detector system for detecting and deterring wrong-way driving events, comprised of:
    at least one first vehicle motion sensor configured to measure at least one first predetermined vehicle movement test parameter and to transmit a first sensor signal to said at least one computer processor when said at least one vehicle movement test parameter corresponds to a first threshold;
    at least one additional vehicle motion sensor configured to measure at least one additional predetermined vehicle movement test parameter and to transmit at least one additional sensor signal to said at least one computer processor when said at least one additional predetermined vehicle movement test parameter corresponds to an additional threshold; and
    at least one visual sensor device which is configured to collect visual data and transmit a visual data output to said at least one computer processor,
    wherein said at least one computer processor is configured to receive and process said first sensor signal and said additional sensor signal to invoke functions to produce system outputs to activate at least one traffic control device and to interface with at least one external communications system,
    wherein said system is configured with a combination of said vehicle motion sensors and said at least one visual sensor device to achieve a target rate of error $E_s$ that approaches 0 as the number of sensors increases wherein $E_s$ is a function of a rate of error of each individual sensor within said system, expressed by the following formula:

$$E_s = \frac{E_1 + \ldots + E_n}{n^2}$$

where n represents a total number of sensors in said system and $E_i$ is an error rate for a given vehicle motion sensor or visual sensor device, where $i=1 \ldots n$.

2. The system of claim 1, wherein each of said combination of said vehicle motion sensors and said at least one visual sensor device is configured to test a quasi-unique set of data parameters.

3. The system of claim 1, wherein said system is configured with a combination of vehicle motion sensors and at least one visual sensor device to achieve a target rate of reliability R for a given number of vehicle motion sensors and visual sensor devices n based on an incremental accuracy of each of said given vehicle motion sensors and visual sensor devices and adjusted for overlap between predetermined vehicle movement test parameters using the following equation:

$$R = \frac{r_1 + \ldots + r_n - (nr_o)}{n - (nr_o)}$$

where $r_i$ is said incremental accuracy for a given vehicle motion sensor or visual sensor device where $i=1 \ldots n$ and $r_0$ is said overlap between predetermined vehicle movement test parameters of said given vehicle motion sensors and visual sensor devices.

4. The system of claim 3, wherein said at least one first vehicle motion sensor and said at least one additional vehicle motion sensor have quasi-unique directional orientations to increase testing accuracy.

5. The system of claim 3, wherein said at least one first vehicle motion sensor and said at least one additional vehicle motion sensor have quasi-unique geographical locations to increase testing accuracy.

6. The system of claim 1 wherein said visual sensor device is configured to transmit said visual data output to said at least one external communications system for verification of a wrong-way driving incident.

7. The system of claim 1 wherein said first vehicle motion sensor has a first rate of error and each of said at least one additional vehicle motion sensor has an independently determined additional rate of error.

8. The system of claim 1 wherein said first vehicle motion sensor is configured with said at least one first predetermined vehicle movement test parameter which is different from said at least one additional predetermined vehicle movement test parameter of said at least one additional vehicle motion sensor to increase testing accuracy and avoid system error propagation.

9. The system of claim 1 wherein said visual sensor device is configured to sense at least one predetermined visual vehicle movement test parameter, which is different from, said at least one first predetermined vehicle movement test parameter and said at least one additional predetermined vehicle movement test parameter to increase testing accuracy and avoid system error propagation.

10. The system of claim 1 wherein said at least one visual sensor device continuously monitors a predetermined field of view, and is further configured to identify at least one predetermined visual vehicle movement test parameter which is inconsistent with a visual threshold and provide an image annotation.

11. The system of claim 10 wherein said image annotation is a time stamp.

12. The system of claim 1 wherein said visual sensor device is configured to analyze said visual data to obtain vehicle motion data.

13. The system of claim 1 wherein said at least one computer processor includes at least one storage component configured to receive and store data.

14. The system of claim 1, wherein said at least one computer processor is configured to display a graphic user interface selected from a group consisting of an interactive map and a dashboard display.

15. The system of claim 1, which further includes at least one mounting component.

16. The system of claim 15, which includes a plurality of geographically dispersed mounting components, vehicle motion sensors and at least one visual data sensor in interoperable communication with at least one computer processor.

17. The system of claim 1, wherein said at least one traffic control device is a traffic control device including a plurality of lights that flash in a predetermined cueing pattern when said at least one traffic control device receives said first sensor signal, said at least one additional sensor signal or said system output.

18. The system of claim 1, wherein said first sensor signal, said at least one additional sensor signal and said visual data output is selected from the group consisting of: a component activation signal which activates or changes the state of a system component, a communication output signal which interfaces with a communication system, and an archival output signal which initiates a process for saving, storing or archiving data.

19. The system of claim 1, wherein said system output is selected from the group consisting of: a component activation signal which activates or changes the state of a system component, a communication output signal which interfaces with a communication system, and an archival output signal which initiates a process for saving, storing or archiving data.

* * * * *